United States Patent [19]

Kubicek

[11] 3,765,790

[45] Oct. 16, 1973

[54] TOOL HOLDER
[75] Inventor: Louis A. Kubicek, Ypsilanti, Mich.
[73] Assignee: Burr-Ban Tool Service Company, Detroit, Mich.
[22] Filed: Nov. 22, 1971
[21] Appl. No.: 200,865

Related U.S. Application Data
[63] Continuation-in-part of Ser. No. 887,059, Dec. 22, 1969, Pat. No. 3,658,435.

[52] U.S. Cl.................. 408/226, 408/239, 408/714
[51] Int. Cl.......................................... B23b 51/16
[58] Field of Search................... 408/141, 226, 239, 408/714; 10/89 F, 141 H

[56] References Cited
UNITED STATES PATENTS
3,234,573    2/1966    Halpern............................ 408/714

Primary Examiner—Francis S. Husar
Attorney—Robert C. Hauke et al.

[57] ABSTRACT

A tool holder having a cylindrical housing adapted to be inserted into a chuck of a rotating drive machine. The tool holder housing has a radially enlarged intermediate bore opening to the opposite ends of the housing through forward and rearwardly located aligned bores which, in turn, slidably support the shank portion of a deburring tool in such a manner that the deburring tool is adapted to rotate about the longitudinal axis of the tool holder when the same is rotated by the rotary drive machine. A coil spring disposed within the intermediate housing bore has one end bearing against the housing and the other end bearing against a collet carried by the deburring tool shank to bias the deburring tool outwardly while abutment of the collet with the inner housing wall associated with the forward bore limits the amount of outward movement of the deburring tool. The deburring tool shank has an elongated slot paralleling the longitudinal axis of the housing and in which a pin, carried by the housing, is received such that the pin and slot cooperate to permit relative sliding movement between the tool and the housing along the longitudinal axis of the housing while precluding relative rotation between the deburring tool and the tool holder housing as the same is rotated by the drive machine. During the feed-in mode of the machine for the deburring of holes previously drilled, the coil spring functions to maintain the deburring tool outwardly so that the same may perform a deburring operation, while providing means for adjusting the extent of deburring formed on the leading edge of the hole as well as permitting the tool to be retracted along the longitudinal axis of the tool holder housing in the event the deburring tool engages an unfinished hole resulting from a prior drill breakage, to thereby prevent the deburring tool from being forced into an unfinished hole and broken.

16 Claims, 4 Drawing Figures

PATENTED OCT 16 1973 3,765,790
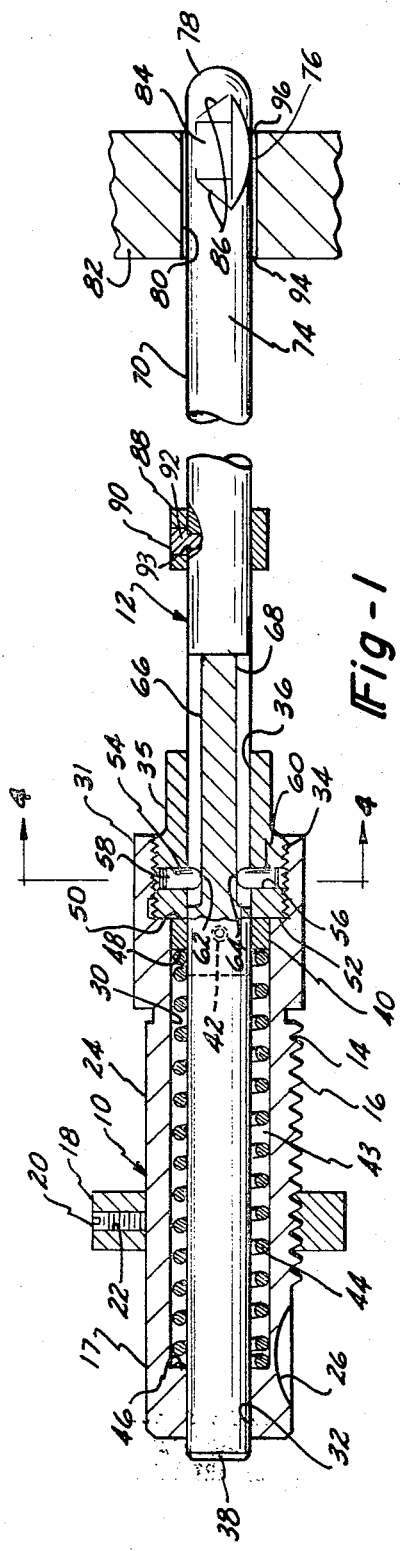
Fig-1
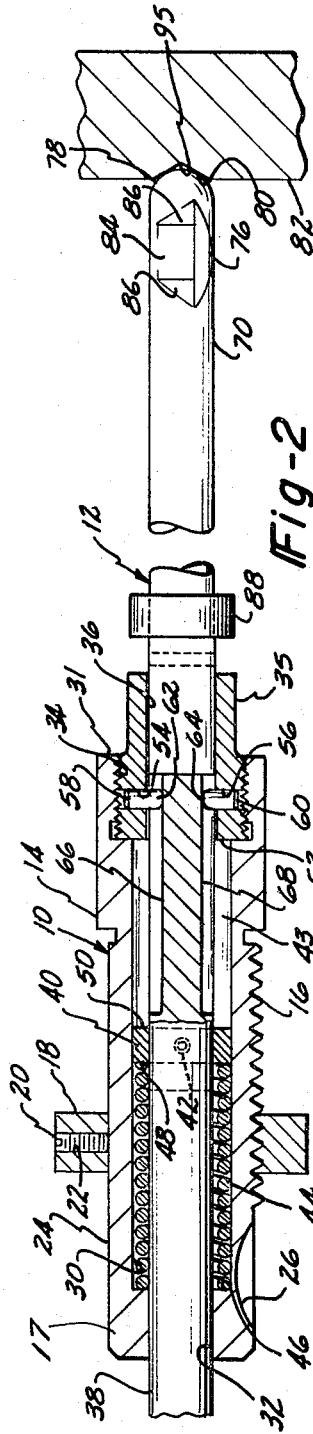
Fig-2
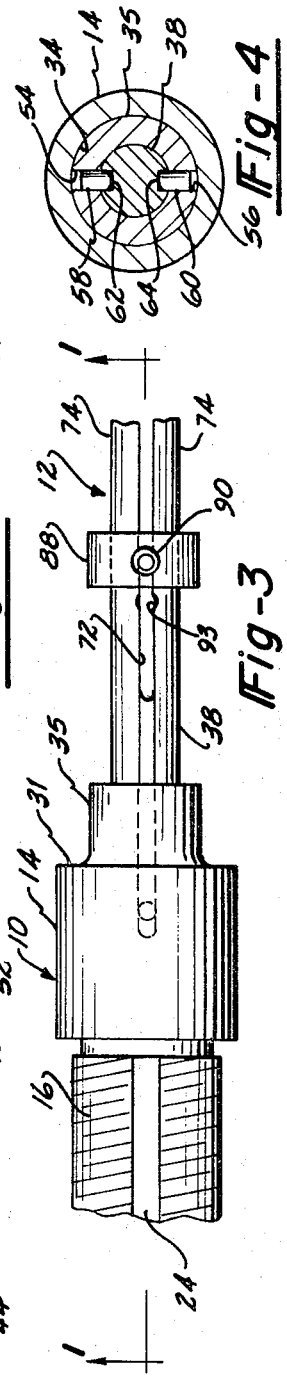
Fig-4
Fig-3

TOOL HOLDER

CROSS REFERENCE TO RELATED APPLICATION

The present application is a continuation-in-part of patent application Ser. No. 887,059 filed Dec. 22, 1969 and now U.S. Pat. No. 3,658,435 and is related to co-pending U.S. Pat. application Ser. No. 197,663, filed Nov. 10, 1971, which is a continuation-in-part of patent application Ser. No. 887,060 filed Dec. 22, 1969, and now U.S. Pat. No. 3,661,473.

BACKGROUND OF THE INVENTION

1. Field of the Invention

The present invention relates to tool holders and, more particularly, to a deburring tool holder having means permitting the deburring tool carried thereby to be moved from a normally extended position to a partially retracted position upon completion of the deburring on the leading edge of the hole or to a fully retracted position in the event the deburring tool engages an unfinished hole.

2. Description of the Prior Art

In the drilling and deburring of holes in workpieces it is a common practice to immediately debur the edges of the drilled hole. Usually in this type of operation, the workpiece is passed in front of several machine chucks having the necessary tools to perform the drilling and deburring operations, however, the drilling and deburring operations are normally out of view of the machine operator and the workpiece passes into the view of the operator only after both operations have been completed. Even when a drill is accidentally broken during the drilling operation, resulting in an unfinished hole, the workpiece is automatically advanced to the next stage wherein the deburring operation takes place without the operator detecting that the drill has been broken. In most deburring operations and especially those where deburring is accomplished on both sides of the hole by a single deburring tool, the tool must pass through the hole upon completion of deburring on the leading edge. As the deburring tool is advanced into the unfinished hole, the end of the deburring tool will engage the inner surface of the unfinished hole and may very well be broken under the feed-in force exerted by the chuck thereby necessitating a replacement of both the broken drill and the broken deburring tool. Further, in this type of deburring tool used for deburring workpieces on both sides of a hole, a certain amount of dwell time in the feed-in stroke is necessary to accomplish deburring on the leading edge of the hole. Some machines do not provide means for providing adequate dwell time for the deburring operation.

SUMMARY OF THE INVENTION

The present invention which will be described subsequently in greater detail comprises an improved deburring tool holder having means which permits the deburring tool to be retracted within the tool holder to provide sufficient dwell time on the leading edge of the hole to be deburred to provide proper deburring and in the event the deburring tool engages an unfinished hole during a deburring operation.

It is, therefore, an object of the present invention to provide a new and improved deburring tool holder adapted to insure proper deburring and to prevent breakage of deburring tools in the event the same engage an unfinished drilled hole.

Other objects, advantages, and applications of the present invention will become apparent to those skilled in the art of tool holders when the accompanying description of an example of the best mode contemplated for practicing the invention is read in conjunction with the accompanying drawing.

BRIEF DESCRIPTION OF THE DRAWING

The description herein makes reference to the accompanying drawing wherein like reference numerals refer to like parts throughout the several views, and in which:

FIG. 1 is a cross-sectional view of a deburring tool and tool holder constructed in accordance with the principles of the present invention and taken along line 1—1 of FIG. 3;

FIG. 2 is a cross-sectional view of the deburring tool and tool holder illustrated in FIG. 1 with the deburring tool bearing against an unfinished hole in a workpiece;

FIG. 3 is a fragmentary top elevational view of the deburring tool and tool holder illustrated in FIGS. 1 and 2; and FIG. 4 is a cross-sectional view of the deburring tool and tool holder taken on line 4—4 of FIG. 1.

DESCRIPTION OF THE PREFERRED EMBODIMENT

Referring now to the drawing and, in particular, to FIGS. 1 and 2 wherein there is illustrated a tool holder 10 adapted to carry a deburring tool 12 such that the tool holder 10 and the deburring tool 12 are adapted to be rotated about their axes of elongation by the chuck of a suitable rotary machine, not shown.

The tool holder 10 comprises a cylindrical housing 14 having threads 16 formed along the outer surface proximate the rear end 17 for mounting an adjustment collar 18 screwed thereon. The adjustment collar 18 is provided with a set screw 20 threaded into an aperture 22 extending through the collar 18 for locking the collar on the housing 14 at a desired axial position along the threads 16. When the outer housing 14 is inserted into the chuck of the rotary drive machine, the collar 18 engages the front surface of the chuck to provide an adjustable stop to axially locate the housing 14 of the tool holder 10 with respect to the chuck.

As can best be seen in FIG. 3, a portion of the thread 16 is ground away to provide a flat surface 24 into which the set screw 20 engages to secure the collar 18 in position. The flat surface 24 is also adapted to receive a set screw (not shown) carried by the drive machine to secure the outer housing 14 into the chuck. A woodruff key slot 26 is formed in the housing 14 adjacent the rear end 17 and the slot 26 receives a woodruff key (not shown) carried by the drive machine chuck for rotatably providing a simple means of transferring the rotating motion of the drive machine to the outer housing 14 to rotate the same about its axis of elongation as the chuck is rotated in the conventional manner.

The housing 14 is formed with an enlarged cylindrically shaped intermediate bore 30 extending from the front end 31 of the tool holder housing 14 on an axis coincident with the axis of elongation of the housing 14 and opening to the rear end 17 of the housing 14 through a smaller diameter bore 32 which, similarly, is disposed about an axis coincident with the axes of elongation of the housing 14 and the bore 30. At the forward end 31 of the housing 14, the bore 30 has a threaded surface 34 which threadedly receives a cylindrically shaped collar 35 having a bore 36 extending completely therethrough and opening into the housing bore 30. The axis of the collar bore 36 is coincident with the axis of elongation of the housing 14 and thus is axially aligned with both housing bores 30 and 32. The housing bore 32 and the collar bore 36 function as bearing surfaces which slidably support a shank portion 38 of the deburring tool 12 such that the deburring tool 12 will move axially along the axis of elongation of the housing 14 as well as rotate about the axis of elongation of the housing 14 in a manner which will be explained in greater detail hereinafter.

A cylindrical collet 40 is mounted around the shank portion 38 and is securely fastened to the shank portion 38 by a set screw 42. The collet 40 has an outer diameter slightly less than the diameter of the bore 30 such that the collet 40 may move axially with the shank portion 38 without interference with the bore 30. As can best be seen in FIG. 1, the annular space 43 formed between the peripheral surface of the shank portion 38 and the bore 30 accommodates a coil spring 44 which surrounds the shank portion 38 of the deburring tool 12 and has one end bearing against an inner wall 46 associated with the rear end 17 of the housing 14, while the other end of spring 44 bears against the inner side 48 of the collet 40 to urge the collet 40 and thus the deburring tool 12 outwardly with respect to the front end 31 of the housing. Outward movement of the deburring tool 12 is limited by the abutment of the forward side 50 of a collet 40 with the inner face 52 of the collar 35. Thus the inner face 52 of the collar 35 functions as a means for limiting the outward movement of the deburring tool 12.

As can best be seen in FIGS. 1, 2 and 4, the collar 35 is formed with a pair of diametrically opposed, radially extending threaded apertures 54 and 56 that open into the collar bore 36 and which respectively receive set screws 58 and 60, having cylindrical projections 62 and 64 on their respective inner ends. The cylindrical projections 62 and 64 extend through their respective apertures and are received in elongated slots 66 and 68, respectively, in the shank portion 38 of the deburring tool 12. The elongated slots 66 and 68 are substantially parallel the axis of elongation of the shank portion 38, and thus it can be seen that as the housing 14 is rotated by the machine chuck, the projections 62 and 64 engaging the surface forming the slots 66 and 68, respectively, translate the rotary motion of the housing 14 to the shank portion 38 such that the deburring tool 12 rotates with the housing 14 about its axis of elongation, however, the cylindrical projections 62 and 64 will not preclude the shank portion 38 from sliding axially within the housing bores 30 and 32 and the collar bore 36 for a purpose to be explained hereinafter.

The deburring tool 12 has a lower portion 70 preferably formed with a longitudinally extending through slot 72 defining a pair of substantially parallel and symmetrical support columns 74 having substantially arcuately shaped cutting ridges 76 formed near the end of each of the support columns 74 (only one of which is shown in FIGS. 1 and 2). The cutting ridges 76 are spaced axially somewhat from the free ends of the support columns 74 to form a pilot portion 78 to aid in the insertion of the deburring tool 12 into a hole 80 (FIG. 1) of a workpiece 82 that is to be deburred. The cutting ridges 76 are each provided with substantially radially extending flat surface portions 84 that are disposed in substantially parallel planes on opposite sides of the deburring tool 12 and which provide sharp cutting edges 86 at each side of the ridges 76. A more detailed description of the deburring tool hereinbefore described may be found by reference to U.S. Pat. No. 3,230,798 issued Jan. 25, 1966.

A collar 88 is mounted around the support columns 74 and is retained in position by means of a set screw 90 integrally carrying a pin 92 disposed to extend inwardly into one of a plurality of tension slots 93 axially spaced along the length of the slot 72 as shown in FIG. 3. When the set screw 90 is tightened against the outer surface of the support columns 74, the pin 92 provides a fulcrum for the support of the columns 74 at the point of adjustment so that the flexibility of the support columns 74 will depend upon the longitudinal position of the collar 88.

In use the deburring tool 12 is attached to the housing 14 of the tool holder 10 in the following manner: the collar 35 is positioned on the shank portion 38 of the tool holder 12 with the apertures 54 and 46 being in radial alignment with the slots 66 and 68 such that the set screws 58 and 60 may be tightened down until the cylindrical projections 62 and 64 are respectively received within the slots 66 and 68 of the shank portion 38. The set screws 58 and 60 are tightened down in such a manner that the shank portion 38 will not rotate relative to the collar 35 but is free for axial movement relative to the collar 35. The collet 40 is then positioned on the shank 38 and is secured in place by tightening the set screw 42. The spring 44 is then positioned around the shank portion 38 with the lower end of the spring abutting against the surface 48 of the collet 40. The entire assembly is then positioned in the bore 30 with the projecting end of the shank portion 38 extending through or at least partly disposed within the smaller diameter housing bore 32, while the collar 35 threadedly engages the threads 34 in the housing 14 to secure the deburring tool to the tool holder 10. With the deburring tool 12 so assembled, the tool holder 10 is ready to be installed on the drive machine chuck.

In operation the adjusting collar 18 is positioned on the housing 14 in such a manner as to set the distance that the housing 14 will extend into the machine chuck. The woodruff key is then inserted into the slot 26 and the rear end 17 and the housing 14 are inserted into the machine chuck until the face of the chuck is flush with the collar 18. The housing 14 is secured in place by turning the set screw carried by the machine chuck against the surface 24, as aforementioned. As positioned, the tool holder 10 and the deburring tool 12 are rotatable about the axis of elongation of the tool holder housing 14 by the chuck of the rotary drive machine.

As can best be seen in FIG. 1, the deburring tool 12 is of the type utilized to debur both edges of a hole and when it is advanced toward the hole 80 to be deburred the pilot portion 78 enters the hole 80 and if the hole 80 has been properly formed, the bottom edges 86 of the ridges 76 engage the upper edge 94 of the workpiece bore 80 with the rotary motion of the tool 12 deburring the same. If the hole 80 has been properly formed completely through the workpiece 82, the deburring tool 12 continues to advance and the columns 74 are pushed together by the engagement of the ridges 76 with the hole 80, allowing the ridges 76 and that portion of the columns 74 to pass through the hole 80 to debur the bottom edge of the hole 80. When the ridges 76 have cleared the hole 80, the columns 74 spring back to their original position ready to debur the back edge 96 of the hole 80 on the back stroke of the drive machine in the conventional manner.

As can best be seen in FIG. 2, if the hole 80 has not been properly formed to a sufficient depth due to the breakage of the drill or the like, then as the deburring tool 12 is advanced toward the hole 80 to be deburred the pilot portion 78 will enter the hole but as the deburring tool 12 continues to be fed into the hole 80 by the drive machine, the pilot portion 78 will engage the inner end 95 of the unfinished hole 80, or will engage the upper surface of the workpiece 82 if no hole at all has been formed, stopping the advancement of the tool 12. The continued feed-in of the drive mechanism pushes the shank portion 38 of the deburring tool 12 against the bias of the spring 44 through the housing bore 30 and the smaller diameter housing bore 32 such that the rear end of the shank portion 38 will extend axially rearwardly into a clearance space in the rotary machine. As the shank portion 38 is pushed into the housing bores, the inner end of the projections 62 and 64 slide along the slots 66 and 68, respectively, and thus permitting the rod to be retracted into the bore 30 even while the tool holder 10 and the deburring tool 12 continue to rotate.

As the shank portion 38 is pushed into the housing bore 30 and externally thereof through the housing bore 32, the coil spring 44 is compressed between the inner surface 46 of the housing 14 and the inner surface 48 of the collet 40. The compression of the spring 44 during the feed-in of the machine chuck allows the tool 12 to remain with its pilot portion 78 in contact with the workpiece 82 without pushing the deburring tool further into the unifnished hole 80, and thus the tool holder 10 prevents the deburring tool 12 from being broken during the feed-in of the drive machine when the hole 80 has not been properly formed in the workpiece 82.

It should be noted that the means for retracting the deburring tool 12 while the drive mechanism is advancing provides a convenient means for permitting the deburring tool 12 to dwell for a sufficient time at the leading edge of the hole 80 to complete the deburring operation and therefore permits use of the type of deburring tool shown with machines which do not have means for providing such dwell time.

It should also be noted that the strength of the spring 44 may be varied in accordance with the strength of the support columns 74 such that if the support columns 74 are weak, a weak spring 44 is utilized. Furthermore, the strength of the spring 44 should be varied depending upon the position of the collar 88. As the collar 88 is moved toward the ridges 76, an increased force is required to push the support columns 74 together to allow the ridges 76 to be pushed into the hole 80 and thus as the collar 88 is moved toward the ridges 76 a stronger spring 44 should be required.

Although only one embodiment of the invention has been disclosed, it is to be understood by those skilled in the art of tool holders that various changes and revisions may be made thereto without departing from the spirit of the invention or the scope of the appended claims.

I claim:

1. The combination of a tool holder and a deburring tool comprising:
   a housing having axially aligned end bores disposed along the longitudinal axis of said housing and opening out to the opposite ends of said housing, said bores being connected by a radially enlarged intermediate bore disposed between the opposite end portions of said housing;
   a deburring tool means having a portion extending through ane slidably supported by said housing end bores, said deburring tool means having a second portion extending from one end of said housing through one of said aligned bores to a point axially spaced from said housing and adapted to perform a deburring operation when rotated by said housing, said deburring tool means having an axially extending slot formed in the exterior surface thereof;
   means carried by said housing and extending into said slot to preclude relative rotation between said housing and said deburring tool portion while permitting said deburring tool means to move axially within said bores with respect to said housing;
   means carried by said housing for limiting axial outward movement of said deburring tool means through said one end of said housing; and
   biasing means in said enlarged intermediate bore urging said deburring tool means axially outward to the limit permitted by said limiting means.

2. The combination defined in claim 1 wherein said limiting means comprises a cylindrical collet secured to said deburring tool means and axially movable with said deburring tool means within said enlarged intermediate bore, said collet abutting an inner wall of said housing associated with said one end bore at said one end of said housing to limit said outward movement of said deburring tool means.

3. The combination defined in claim 2 wherein said biasing means comprises a coil spring disposed in said enlarged intermediate bore and surrounding said deburring tool means with the opposite ends of said spring respectively bearing against the other side of said collet and the inner wall of said housing associated with the other end bore, said spring urging said deburring tool means axially outwardly through said one end bore.

4. The combination defined in claim 1 further comprising a collar having a longitudinal bore defining said one end bore, said collar being releasably attached to said one end of said housing in such a manner that the collar bore and said other end bore are axially aligned to slidably support said deburring tool means.

5. The combination defined in claim 4 wherein said collar has a pin extending radially therethrough into said collar bore and into said deburring tool slot, said pin and said slot cooperating to preclude relative rotational movement of said tool with respect to said housing while permitting relative axial movement between said deburring tool means and said housing bores.

6. The combination defined in claim 5 wherein said collar has a threaded peripheral surface adapted to threadably engage said one end of said housing for releasably attaching said collar thereto.

7. The combination defined in claim 4 wherein said limiting means comprises a cylindrical collet secured to said deburring tool means and axially movable therewith within said enlarged intermediate bore, one side of said collet abutting an inner wall of said collar to limit outward movement of said deburring tool means.

8. The combination as defined in claim 7 wherein said biasing mean comprises a coil spring disposed in said enlarged intermediate bore and surrounding said deburring tool means with the opposite ends of said spring respectively bearing against the other side of said collet and the inner wall of said housing associated with said other end bore, said spring urging said deburring tool means axially outward until said one side of said collet abuts the inner wall of said collar.

9. The combination as defined in claim 8 wherein said collar has a pin extending radially therethrough into said collar bore with the extended end of said pin being disposed in said slot, said pin and said slot cooperating to preclude relative rotational movement between said deburring tool means and said housing, while permitting relative axial sliding movement between said deburring tool means and said housing.

10. The combination defined in claim 9 wherein said pin is threadedly secured to said collar.

11. The combination as defined in claim 1 wherein said deburring tool means comprises a first shank portion extending into and slidably supported by said housing end bores and a second shank portion having cutting means at one end thereof and extending from said housing, said second shank portion comprising a pair of spaced apart columns; and means carried by said second shank portion for varying the effective length of said columns.

12. The combination as defined in claim 11 wherein said last mentioned means comprises a second pin extending between said columns for providing a fulcrum between said columns which varies the effective length of said columns.

13. The combination of a tool holder and a deburring tool comprising:
a cylindrical housing having a bore formed therein;
a deburring tool means having a portion extending from within said bore exteriorly of said housing;
said deburring tool means having an exterior surface and a straight, axially extending elongated slot formed in said exterior surface,
means carried by said housing and limiting outward axial movement of said deburring tool means,
a pin carried by said housing and extending into said slot to preclude relative rotation between said housing and said deburring tool means but permitting said deburring tool means to move axially with respect to said housing, and
a spring carried in said bore and urging said deburring tool means axially outwardly to the limit permitted by said limiting means.

14. A compression tool holder for placement in the chuck of a rotary drive machine, comprising:
an outer housing having a bore formed therein;
a tool supporting rod having an end portion slidably mounted within said bore;
means operatively connected between said outer housing and said rod for rotating said rod with said housing;
biasing means operatively connected between said housing and said rod for urging said rod toward one open end of said bore;
tool holding means on the outer end of said rod;
said means for rotating said rod with said housing including an elongated slot formed in said rod substantially parallel to the axes of elongation of said rod, and a projection secured to said outer housing and extending into said slot; and
said tool holding means including a cylindrical collar removably mounted to the inner end of said rod within said bore and a collet removably mounted to said housing to retain said collar within said bore.

15. A tool holder as defined in claim 13 wherein said biasing means includes a coil spring.

16. A tool holder as defined in claim 1 and including a cylindrical collet slidably mounted around said rod within said bore adjacent the opening of said bore, said collet being secured to said outer housing for forming a bearing surface with said rod, said rod includes an inner end forming a bearing surface with one end of said bore, said biasing means includes a coil spring disposed within said bore for urging said rod toward the open end of said bore, said rod includes an elongated slot formed therein substantially parallel to the axis of elongation of said rod, and means secured to said housing and having a projection formed thereon extending into said slot for rotating said rod with said housing.

* * * * *

UNITED STATES PATENT OFFICE
CERTIFICATE OF CORRECTION

Patent No. 3,765,790                    Dated October 16, 1973

Inventor(s)   Louis A. Kubicek                    (BUR-103-B-1)

It is certified that error appears in the above-identified patent and that said Letters Patent are hereby corrected as shown below:

Column 4, line 22, change "46" to --56--.

Column 6, line 10, change "ame" to --and--.

Signed and sealed this 15th day of January 1974.

(SEAL)
Attest:

EDWARD M. FLETCHER, JR.              RENE D. TEGTMEYER
Attesting Officer                    Acting Commissioner of Patents